(No Model.)
G. WHITNEY.
PHOTOGRAPHIC CAMERA.
No. 471,584. Patented Mar. 29, 1892.
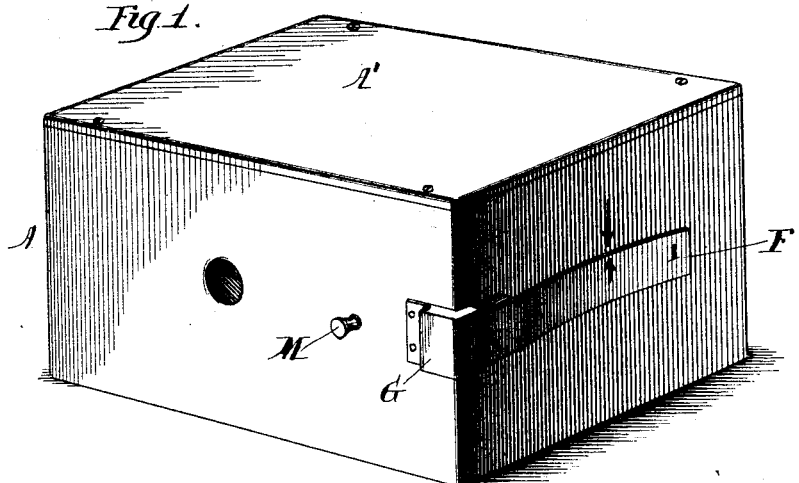
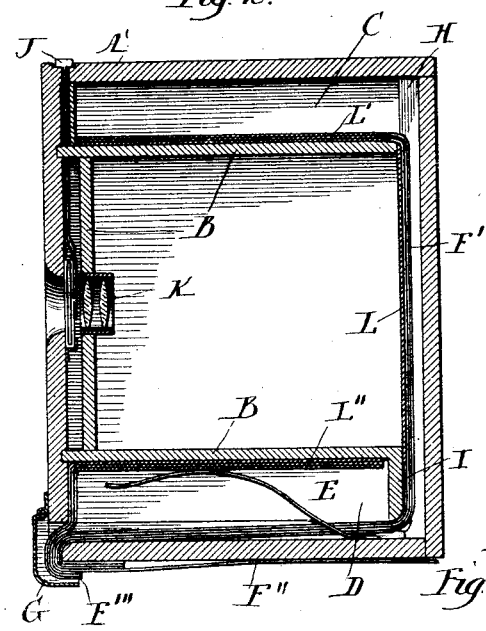
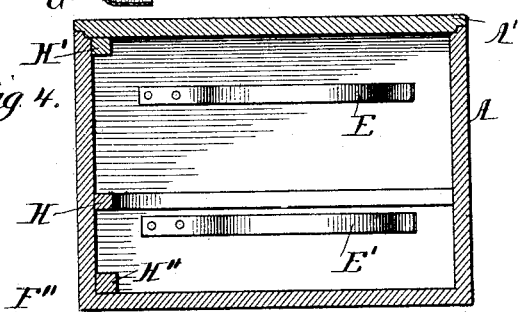
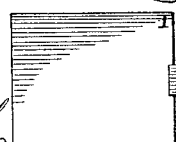
Witnesses:
Fred Gerlach
Wm H Scott
Inventor:
George Whitney
By Charton Whitney
his attorney

UNITED STATES PATENT OFFICE.

GEORGE WHITNEY, OF WINNETKA, ILLINOIS.

PHOTOGRAPHIC CAMERA.

SPECIFICATION forming part of Letters Patent No. 471,584, dated March 29, 1892.

Application filed October 2, 1890. Serial No. 366,847. (No model.)

*To all whom it may concern:*

Be it known that I, GEORGE WHITNEY, of Winnetka, in the county of Cook and State of Illinois, have invented certain new and useful Improvements in Cameras and Plate-Holders; and I do hereby declare the following to be a full, clear, and exact description of the same, reference being had to the accompanying drawings, forming a part of this specification, and to the letters of reference marked thereon.

My invention has for its objects to provide an improved device for containing and handling photographic sensitized plates, embodying chambers or compartments for containing the plates both before and after exposure, whereby they may be manipulated from the exterior of the holder without necessitating opening the latter or the employment of complicated and bulky transferring devices, thereby not only reducing the bulk, but materially simplifying and cheapening the construction and the operations necessary for the exposure of a plate.

In the present embodiment of my invention I have shown a holder for the plates or film-sheets, which latter I prefer to employ combined with a camera—that is to say, an exposing-chamber—and lens-support are embodied in its construction; but, except as limited by the claims, I do not desire to be confined to this construction, as it will be understood that the plate containing part could constitute a separate structure adapted for application to any form of camera.

In the accompanying drawings, Figure 1 is a view of a camera embodying a holder constructed according to my invention; Fig. 2, a sectional view showing the plates in position; Fig. 3, a similar view of the camera empty;
Fig. 4, a sectional view of the receiving-chamber of the camera. Fig. 5 is a view of a negative-plate adapted for use in a camera or holder made in accordance with my invention.

Similar letters of reference in the several figures indicate similar parts.

In my holder and camera any form of sensitized negative-plate may be used; but I prefer flexible transparent or translucent celluloid or some similar material on account, primarily, of its flexibility, as it enables me to greatly reduce the size of the apparatus, as such a plate may be readily bent, so as to turn sharp corners. Said plates are preferably of a size for a single exposure, and to each is attached a tape or string of flexible material— such as paper or fabric—in any suitable manner—such as by coating its end with cement or mucilage—and its length is preferably so proportioned to that of the holder to which it is adapted that one end will project to the exterior of the casing or holder when the plate is in the compartment for unexposed plates, passing through the channel the plate passes through. This tape is also preferably of such a nature that it may be readily torn or its connection with the plate severed after its office as a transferring medium has been accomplished, and upon it may be placed suitable instructions for the guidance of the user, an indicating-mark, a designating-mark corresponding to a similar one on the plate to which it is attached, and, if desired, adapted to receive written memoranda made by the operator or user. Instead of forming this tape attached to the plate of a separate strip of paper, which, however, I prefer, it is obvious that it could be of the same material as the plate itself, being formed integral with it.

In Fig. 5 is shown the construction above described, L''' indicating the plate and F'' the attached tape, both the plate and tape containing the designating-numeral 1 and the latter the arrow as the indicating-mark.

Referring again to the drawings, the present form of combined holder and camera will be seen to consist of a main casing A, having a detachable cover A', containing in the front a lens K and any suitable shutter actuated by a button J, and inside the casing are located two partitions B B, dividing it into three chambers or compartments, the central one, with which the lens-opening communicates and in which the sensitized plate is located during exposure, and the compartment C for unexposed and compartment D for exposed plates, the two latter communicating with the central one by narrow channels at the ends sufficiently wide for the passage of a single plate. At the back of the exposing-chamber are arranged three strips H H' H'' for supporting the back of the plate during exposure, the space between them being for the accommodation of the tapes of unexposed plates, as will be described. Within the receiving-compartment D are located, preferably, two springs E E', their free ends projecting against partition B and sufficient space being permitted between them for the passage of the plate-tapes, and at the outer end of said compartment is a passage to the exterior of the casing, formed in part and made light-tight by a hinged coved G, adapted, when desired, to be swung back, as in dotted lines, Fig. 3. It is obvious that this passage could be made light-tight by other means and that the hinged cover-plate could be dispensed with; but I prefer it because it enables the plate-tapes to be more readily passed through it when inserted in the holder. Also at the receiving end of chamber D is located an abutment or partition I, projecting near the outer side of said compartment, leaving a narrow channel and serving to protect the ends of the exposed plates from contact with subsequently entering ones, as the springs E E' will move said plates against the partition when within said chamber.

The manner of using my improved holder and camera will now be apparent. The packages of unexposed plates (indicated by L') are placed in compartment C by removing cover A' or otherwise, and their tapes F' are passed around back of what corresponds to an exposing-aperture—that is to say, back of the lens-opening—between strips H and H', thence through chamber D between springs E E', and out through the passage-way formed by plate G, said tapes being readily inserted by swinging back plate G and then occupying the position of those nearest casing shown in in Fig. 2.

When desired to make an exposure, the operator grasps the outside tape of the series and draws upon it, pulling the attached plate around to the position indicated at L, Fig. 2, the position being indicated when the arrow on said tape corresponds with another one on the exterior of the casing, as in Fig. 1. Then the exposure is made in the usual or any manner and he draws upon the tape again, pulling the plate around into compartment D, as shown at L'', and as soon as its end passes abutment I the springs E E' press it against the partition B. He then tears off the tape and may enter any memoranda regarding the subject, light, or time of exposure upon it, which may be referred to when the negative is developed.

As the ends of the tapes project from the holder or camera both before and after the plates have been exposed, the operator can readily ascertain the number of plates remaining unexposed.

I have used the term "plates" or "film-sheets" herein, referring to those described; but by plates in the claims I refer, broadly, to any sensitized surface, whether of glass, paper, celluloid, or other material, it being of course understood that where rigid material, as glass, is used, the construction of the holder will necessarily be modified somewhat, and also that as far as the construction of the holder or camera is concerned it is immaterial whether the tape described is attached to the plate directly or to a plate sheath or holder which carries it.

By locating the compartments C and D on opposite sides of the exposing-chamber, as shown, great economy in space is secured and the camera brought within very small compass; but by the statement in the claims that the plate-support is between the two receiving-compartments, I do not wish to confine myself to this particular construction, as the two receptacles could be located behind instead of in front of the support.

The particular construction of the plate or film-sheet and its operating tape I do not desire to claim herein, having made this the subject-matter of a divisional application filed May 18, 1891, Serial No. 393,148.

I claim as my invention—

1. A holder for photographic plates, having the compartments for containing the plates before and after exposure, the passage-way between them, plate-supports in said passage-way above the bottom thereof, and an aperture leading from one of the compartments to the exterior of the holder-casing, substantially as described.

2. A holder for photographic plates, having the compartments for containing the plates before and after exposure, the passage-way between them, and a tape-aperture leading from one of the compartments to the exterior of the holder-casing, substantially as described.

3. A holder for photographic plates, having the compartments for containing the plates before and after exposure, the tape-aperture extending from one of said compartments to the exterior of the holder-casing and the cover-plate for said aperture, substantially as described.

4. A holder for photographic plates, having the compartments for containing the plates before and after exposure, the abutment at the entrance to the last-mentioned compartment, guides for directing the plates beyond said abutment, and a tape-aperture extending from said compartment to the exterior of the holder-casing, substantially as described.

5. A holder for photographic plates, having the compartments for containing the plates before and after exposure, the springs arranged in the latter, the abutment at the entrance thereof, and the tape-aperture extending from said compartment to the exterior of the holder-casing, substantially as described.

6. A plate-holder having the compartments for containing the plates before and after exposure, and a tape-aperture leading from the last-mentioned compartment to the exterior of the casing, in combination with a series of separate plates, each having a tape attached thereto and extending to the exterior of the casing through said tape aperture, substantially as described.

7. A plate-holder having the compartments for containing the plates before and after exposure, a plate-support between them, and a tape-aperture leading from the last-mentioned compartment to the exterior of the casing, of a series of separate plates, each having a tape attached thereto, all said tapes passing in proximity to the plate-support through the exposed plate-compartment and out through the tape-aperture, substantially as described.

8. A plate-holder having the compartments for unexposed and exposed plates, a plate-support between them, a tape-aperture leading from the last-mentioned compartment to the exterior of the holder-casing, and an indicating-mark on said casing, in combination with a plate having a tape attached thereto extending out through the tape-opening, said tape having an indicating mark thereon adapted to co-operate with the one on the casing, substantially as described.

9. In a camera and in combination, with the casing embodying an exposing-chamber and plate-support at the rear and a lens, of compartments arranged on opposite sides of said exposing-chamber for unexposed and exposed plates, the latter compartment having a tape-aperture extending from the latter to the exterior of the casing, substantially as described.

GEORGE WHITNEY.

Witnesses:
K. McKEE,
I. WOODWORTH.